United States Patent
Engelbart

[15] 3,647,081
[45] Mar. 7, 1972

[54] DEVICE FOR PURIFYING POLLUTED WATER

[72] Inventor: Fritz Engelbart, Anderten, Germany
[73] Assignee: Orenstein-Koppel and Lubecker Maschinenbau A.G., Lubeck, Germany
[22] Filed: Aug. 19, 1969
[21] Appl. No.: 851,376

[52] U.S. Cl.................................210/150, 261/92
[51] Int. Cl............................................B01d 21/00
[58] Field of Search.............210/150, 151; 261/92, 83

[56] References Cited

UNITED STATES PATENTS 1,912,480  6/1933  Houlis......................................261/92
2,586,692  2/1952  Morel.................................210/150 X

*Primary Examiner*—John Adee
*Attorney*—McGlew and Toren

[57] ABSTRACT

A device for purifying polluted water comprises an immersion body having a surface which provides a receiver of biological turf and which is continuously alternately immersed in the water to be purified and brought in contact with air. The body comprises a reel or drum on the surface of which is wound a hose of a stable cross section and preferably extending in helical multiple superposed layers. The drum is advantageously arranged horizontally within the water to be treated and is rotated about its horizontal axis to cause the layers of hose thereon to periodically dip into and out of the water to be treated.

9 Claims, 5 Drawing Figures

INVENTOR
Fritz Engelbart

INVENTOR
Fritz Engelbart

DEVICE FOR PURIFYING POLLUTED WATER

SUMMARY OF THE INVENTION

This invention relates in general to purifying devices and in particular to a new and useful purification device for highly polluted water which comprises a rotatable immersion body having a multiplicity of separated surface areas permitting adherence of biological turf thereon and which is alternately immersed into and lifted out of the water to be purified.

The decomposition, i.e., purification, of highly polluted water by biological means is known. For this purpose, mechanically driven immersion bodies are used, whose surfaces, dimensioned as large as possible, serve as support for the colonization of a so-called biological turf. The biological turf consists of a film or layer of micro-organisms which decompose the pollutants of the water. Micro-organisms of the biological turf have a very high oxygen requirement. In known devices for the purification of highly polluted water there are used, therefore, mechanically driven immersion bodies, preferably in the form of rotating disks, so that the surfaces of these disks, and with them the biological turf, are immersed in the water to be purified and then exposed to the air again in continuous alternation.

Experience with known devices of the form described has shown that only limited purification outputs can be achieved, and that these outputs moreover vary with the weather conditions. Thus, for example, a lowering of the temperatures has an inhibiting effect on the life and growth of the micro-organisms of the biological turf.

The problem underlying the invention is to provide a remedy and to design a device of the kind referred to above so that high purification outputs can be attained with small dimensions and to a large extent independently of the weather.

For the solution of the above-named problem, an immersion body is provided which includes a reel- or drum-type support arranged horizontally and rotatably and having flexible tubes or hoses of stable cross section wound helically and in multiple superposed layers on its surface.

If the inside diameter of the hoses to be coiled are selected in the new device large enough to exclude with certainty any obstructions by fouling, and if the hoses are coiled helically in multiple layers, possibly leaving certain interstices, then an extremely large surface is obtained in a limited space for the development or uptake of biological turf. It is possible to produce immersion bodies by using coils so that each meter of axial length provides a useful surface which can be covered with biological turf to the extent of many hundreds of square meters.

The new immersion body advantageously constitutes a unit which is divided in maze fashion to include many surfaces capable of carrying the biological turf which are protected from wind, direct solar radiation, or other undesirable weather factors. It appears in particular that when the immersion coil rotates there are formed, within the hose turns, closed-off volumes of air which heat up relatively quickly even at very low air temperatures and in this way provide for the maintenance of the biological processes.

An essential advantage of the new device consists, among other things, in that in its operation, due to the helical course of the hoses and the rotating drive, the water to be purified as well as the air are conveyed in the axial direction of the immersion coil. In this way, in tanks or the like, water currents can be produced in addition to the biological purification, supporting the purification process.

An especially suitable, in particular simple, construction of the new device results if the support is designed as drum or reel with a horizontal axis of rotation.

Of special advantage, however, is a design of the device where the hose has undulatory walls of plastic. This design not only has the advantage that superposed layers of the coiled hoses support each other, but also by undulatory walls a high form stability of the hoses is attained. Moreover, the waveform of the walls leads to a further enlargement of the surface coverable with biological turf. Besides, the use of plastic leads to the advantage that no corrosion whatever needs to be feared, and that above all cleaning is very easy to do. For this construction of the device for the formation of the immersion coil, plastic drain pipes have proven to be most appropriate.

Devices of the kind in question are operated generally in connection with small tanks of small water depth, the water to be purified being supplied to the tanks, and the purified water being discharged at a suitable point. The design of the new device is especially advantageous for such tanks when several supports wrapped with hoses are arranged with their axes of rotation extending radially and in star form around a tank containing polluted water and preferably they are interconnected by a transmission cable. With such a construction, biologically active surfaces in the order of magnitude of several hectares can be obtained in a very small space, so that in a narrowly limited space extremely high purification outputs can be achieved. It is advantageous to arrange the coiling direction of the hoses and the direction of rotation so that the water to be purified enters the immersion coil in the region of the center of the tank and comes out at the rim of the tank. In this way, by rotating the immersion coils an intensive current is produced on the bottom of the tank or from the rim to the center of the tank. This current favors the precipitation and conveyance of sinking and suspended substances. With this design of the device, the immersion coils in star arrangement may be provided at their axial ends with wheels, so that they are moved through the tank while rolling on the rails as a unit.

In another advantageous development of the invention, the outer hose layer is surrounded by a supporting jacket, and the axis of rotation is arranged ascending in the direction of the discharge end. With this design of the device, the immersion coil is utilizable, not only to obtain as large as possible a biological useful surface for the purification of the water, but also as a feed pump for the water to be purified. The pitch of the helically wound hoses, the number of revolutions, and the inclination of the axis of rotation render a control of the delivery possible. The possibility of using the new device as feed pump becomes especially important in view of the fact that an economic conveyance of biological muds becomes possible without impairing the flocculation (or flaks) structure. The combined purifying and conveying action of the new device for the first time provides for the purification of highly polluted water and permits reliable separation of the purified water from the unpurified water. Therefore, all conditions are fulfilled for performing the purification of polluted water in several stages. It is conceivable, for example, first to prepurify the highly polluted water with the device working intensively in relatively small tanks and then to transfer the prepurified water for repurification, into pools and to carry out in the pools especially a mud storage. The pools in turn may be equipped with aerating and circulating devices using large pumps, to avoid formation of dead flow zones. In zones of insufficient water movement there is always the danger that putrefication and fermentation processes develop which lead to strong odor molestation by evolution of gases.

On the other hand, the inventive devices may alternatively be operated in the manner of a cycle by return of at least a portion of the water and mud coming out of the immersion coil. The mud then additionally introduces active micro-organisms into the immersion coil and thereby increases the purification output.

Accordingly, it is an object of the invention to provide an improved device for purifying water which includes a rotatable element such as a drum having an immersion coil wound over its surface, preferably in a spiral from with the coils being spaced apart to define a plurality of surfaces between layers and between coils for receiving the biological turf, the body advantageously being arranged to be cyclically moved into and out of the water to be purified.

A further object of the invention is to provide a water-purifying device which includes a plurality of drums rotatably mounted about horizontal axes and preferably mounted on rail supports for rotation about a central axis and for rotation about their horizontal axes as they are rotated together about the central axis, said drums having one or more hoses of stable cross section and hollow interior helically wound in multiple superposed layers thereon.

A further object of the invention is to provide a water purifying device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
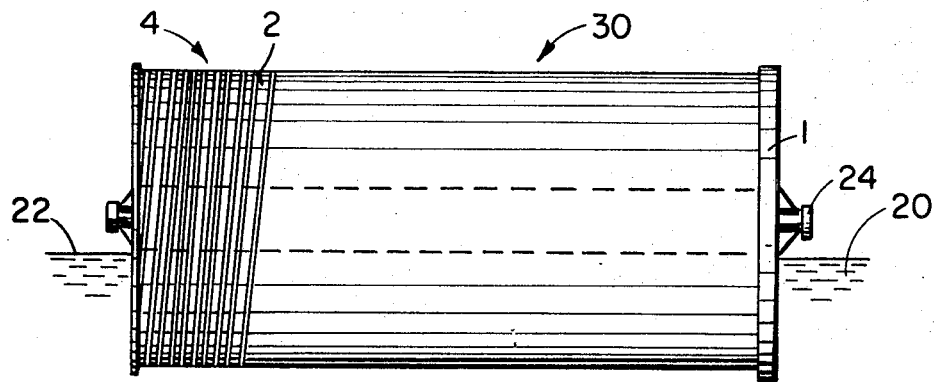
FIG. 1 is a side elevational view of a water-purifying device arranged in a body of water to be purified and constructed in accordance with the invention.
Figure 2:
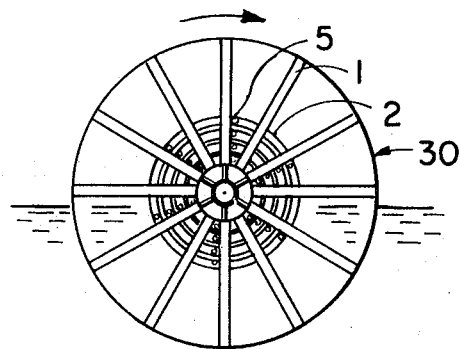
FIG. 2 is a side elevational view of the device indicated in FIG. 1.
Figure 3:
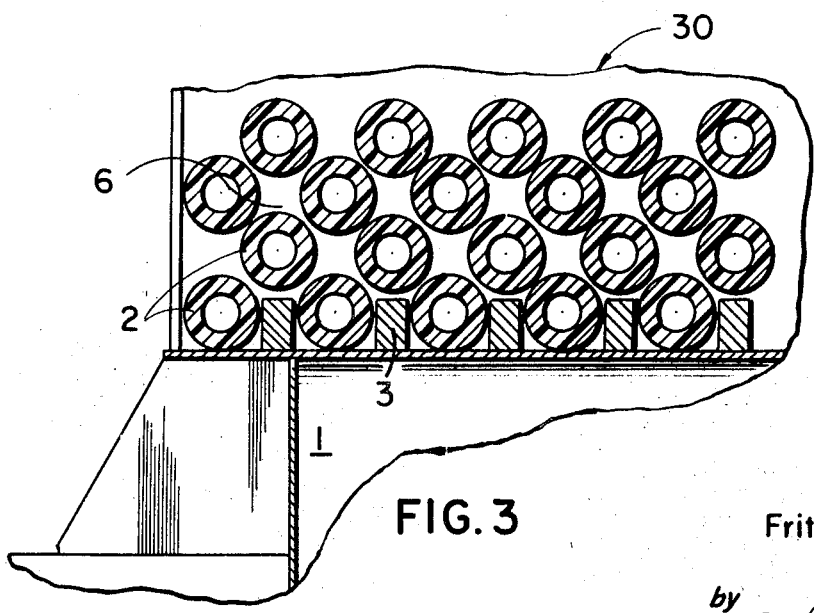
FIG. 3 is a greatly enlarged partial cross-sectional view of the drum indicated in FIG. 1.

Referring to the drawings, in particular to the invention as embodied therein in FIGS. 1 to 3, comprises a water purifying device generally designated 30, particularly for purifying highly polluted water by means of the collection of biological turf comprises a movable support in the form of a rotatable drum or rail 1 which is rotatably mounted for rotation about a horizontal axis in a body of water which is to be purified 20 and which is arranged so that the lower end extends below the surface 22 of the water. A horizontal drum axle 24 is advantageously mounted on means (not shown) for effecting the rotation thereof. In accordance with the invention the support carries hoses of stable cross section 2 which are helically wound in several layers. As shown in FIG. 3, the interior, or first layer or course, is advantageously wound with spacers or coil rings 3 between each helical turn in order to provide a certain preferably spacing therebetween. The hoses 2, which may be of form-stable plastic tubing and preferably corrugated walls, may advantageously be a drain pipe.

As best indicated in FIG. 2, one end of the hose defines an inlet opening 5 which is arranged at this end of the drum and the opposite end of the hose is advantageously arranged to define an outlet (not shown) at the opposite end of the drum. The immersion body including the coil may be set into rotation in the direction of the arrow indicated in FIG. 2 and thus at least a portion of its cross section will be cyclically brought into and out of the water to be purified. The water will enter not only through the inlet openings 5 of the hoses but also into the spaces 6 which are defined between the hoses and between the layers thereof. (see FIG. 3). Therefore, both the external surfaces and the internal surfaces of the hoses 2 are wetted. During the rotation of the immersion coil 4 water and air are alternately exposed to the areas 6 and to the interior flow cross section of the coiled hose or hoses as long as the rotation is continued. The water is gradually moved through or over the immersion coil surfaces in an axial direction along the helically wound hoses 2 in a direction of the winding. The biological turf which is determinative of the purifying effect adheres to the internal and external surfaces of the hose wall. During rotation this turf is alternately wetted with the water to be purified and exposed to oxygen-containing air.

Because, as indicated in FIGS. 1 and 3, there are gaps which are formed between the individual hoses 2 by the spacers 3, the cross-sectional flow area presented by the spaces 6 will have the minimum size necessary to ensure undisturbed operation. As a result of the surfaces of the inside and outside of the hoses being greatly enlarged, because they are formed with corrugations which proceed either circumferentially or axially, larger areas of surface will be available for receiving the purifying biological turf. With such an arrangement of immersion coil several hundred square meters of biological turf per meter of axial length can be provided. In this way a very high purification effect can be obtained. As indicated in FIGS. 1 to 3 the micro-organisms adhering to the surfaces inside the hoses 2 or in the spaces 6 are protected by the volumes of the water present in the lower regions of these cross sections as well as by the walls of the hoses 2 themselves from weather factors, as for example great cold or intensive solar radiation or rain or the like. This means that the immersion coil 4 is able to operate as a device for purifying highly polluted water almost independently of weather conditions.

Figure 4:
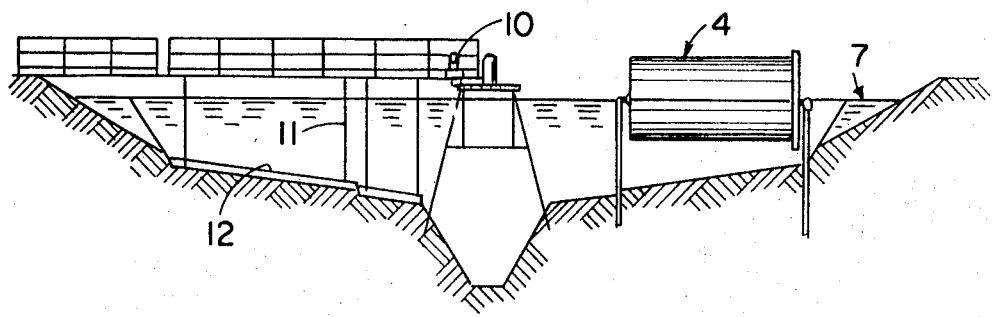
FIG. 4 is a section through a water-purifying pond having a water-purifying device constructed in accordance with another embodiment of the invention.
Figure 5:
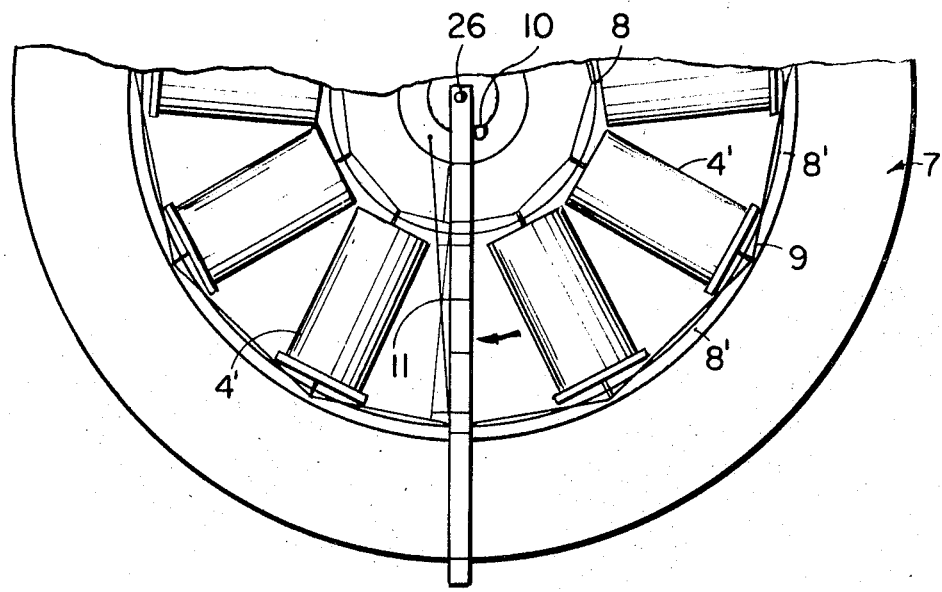
FIG. 5 is a partial top plan view of the device indicated in FIG. 4.

In the embodiment indicated in FIGS. 4 and 5 there is shown a purifying tank 7 of circular form which carries radially spaced circular tracks 8 and 8' which are arranged to rotate about a central axis 26. A plurality of individual immersion coil units 4' are mounted so that their respective axes are rotatably supported at their inner ends on the circular track 8 and at their outer ends on the circular track 8'. All of the units 4' are combined together by connecting elements 9 and a driving device 10 is employed to set the whole assembly into a rotatable motion and permit individual rotation of each of the immersion coil assemblies 4'. The direction of conveyance and rotation is selected so that the rotation of the coils will convey the water radially outwardly from the center of the tank to the periphery. This results in a current flow in the tank from the periphery to the center. This current flow supports the purification process because the resulting sinking substances are conveyed by the current and at least in part deposited at the center of the pool, that is the deepest point thereof.

In the embodiment shown in FIGS. 4 and 5, the immersion coil body assembly 4' is equipped with a clearing or an evacuating device 11 which can be taken along with the unit in the rotatable movement thereof and which includes means at its lower end for scraping the bottom of the tank 12 in a snowplough-type action to push the solids which have sunk to the bottom of the tank toward the center of the tank.

What is claimed is:

1. A purification device, particularly for purifying highly polluted water, comprising a drivable immersion body comprising a tubular closed-surface drum, at least one hose tube wound on the surface of said drum and having coils extending along the surface in a transverse direction and in a manner to define a multiplicity of spaces between respective coil windings, and means for mounting said immersion body for alternate immersion of at least a portion of the surface thereof and the hoses thereon into the water to be purified and for movement out of the water for exposure to the oxygen in the air.

2. A device according to claim 1, including a plurality of immersion bodies rotatably mounted on radial lines around a single revolution point, and means supporting said bodies comprising a rotatable member being rotatable about said revolution point to move all of said immersion bodies therewith and to simultaneously permit rotation of said drums about their own axes.

3. A device according to claim 1 wherein said rotatable drum has a jacket at one end, said hose being wound around said drum and having one end abutting against said jacket.

4. A purification device, particularly for purifying highly polluted water, comprising a drivable immersion body comprising a tubular closed-surface support member, at least one hose tube wound on the surface of said support member in a manner to define a multiplicity of spaces between respective coil windings, and means for mounting said immersion body for alternate immersion of at least a portion of the surface thereof and the hoses thereon into the water to be purified and for movement out of the water for exposure to the oxygen in the air, said immersion body comprising a rotatable drum, said mounting means comprising means for mounting said drum for rotation about a horizontal axis and which is adapted to be positioned so that the said drum and said hose moves into and out of the body of water to be treated during rotation.

5. A device according to claim 4, wherein said hose is a material of stable cross section and has an undulatory wall.

6. A device according to claim 5, wherein said hose is made of plastic.

7. A purification device, particularly for purifying highly polluted water, comprising a drivable immersion body comprising a support member, at least one hose wound on the surface of said support member in a manner to define a multiplicity of spaces between respective coil windings, and means for mounting said immersion body for alternate immersion of at least a portion of the surface thereof and the hoses thereon into the water to be purified and for movement out of the water for exposure to the oxygen in the air, said immersion body comprising a rotatable drum having a plurality of spacers arranged at spaced locations across the width thereof and around the periphery thereof, said hose being wound around said drum in a first layer with alternate coils of said hose and said spacers and in a plurality of additional superposed layers.

8. A device according to claim 7 wherein there is at least one hose having an opening at one end of said drum defining an inlet and an opening at an opposite end of said drum defining an outlet.

9. A device according to claim 7, including a purifying tank carrying at least one immersion body and wherein said hoses are wound in a first direction extending from one side of said body to the other, the rotation of said body being such as to move the water to be purified into the hose in the region of the center of said tank and to advance it outwardly toward the periphery of the tank.

* * * * *